United States Patent [19]
McLaughlin

[11] Patent Number: 5,810,337
[45] Date of Patent: Sep. 22, 1998

[54] SUSPENSION ISOLATING DEVICE

[75] Inventor: Ronald J. McLaughlin, Maumee, Ohio

[73] Assignee: The Pullman Company, Milan, Ohio

[21] Appl. No.: 724,283

[22] Filed: Oct. 1, 1996

[51] Int. Cl.$^6$ ............................... F16F 1/04; F16F 7/00
[52] U.S. Cl. ................................ 267/141.4; 267/140.4; 267/3
[58] Field of Search .................... 248/560, 562, 248/566, 573, 574, 575, 576–621, 632, 634, 636, 638; 267/196, 201, 219, 220, 257, 258, 294, 140.2, 141.1, 141.2, 141.3, 141.4, 141.7, 152, 3; 180/300, 312; 280/716

[56] References Cited

U.S. PATENT DOCUMENTS

| | | | |
|---|---|---|---|
| 2,126,707 | 8/1938 | Schmidt | 267/141.1 |
| 2,678,797 | 5/1954 | Roy | 267/152 |
| 2,942,834 | 6/1960 | Clark | 267/152 |
| 3,212,460 | 10/1965 | Paas | 267/3 |
| 3,289,998 | 12/1966 | Bavatoff | 267/3 |
| 3,323,764 | 6/1967 | Johnson | 267/152 |
| 3,658,314 | 4/1972 | Luzciza | 267/3 |
| 3,701,322 | 10/1972 | Cavle | 267/3 |
| 3,717,105 | 2/1973 | Novotny | 267/3 |
| 3,984,125 | 10/1976 | Paton et al. | 280/716 |
| 4,032,125 | 6/1977 | Minakawa et al. | 267/294 |
| 4,681,306 | 7/1987 | Hofmann et al. | 267/140.13 |
| 4,717,130 | 1/1988 | Barkhage | 267/141.7 |
| 4,921,049 | 5/1990 | Kaisev et al. | 267/140.13 |
| 5,110,097 | 5/1992 | Simon | 267/141.1 |
| 5,263,815 | 11/1993 | Brenner | 180/300 |
| 5,271,678 | 12/1993 | Bourgeot | 267/140.4 |
| 5,413,320 | 5/1995 | Herbst | 267/141.7 |

FOREIGN PATENT DOCUMENTS

| | | | |
|---|---|---|---|
| 519818 | 12/1955 | Canada | 248/634 |
| 1146496 | 3/1985 | U.S.S.R. | 267/141.3 |

*Primary Examiner*—Robert J. Oberleitner
*Assistant Examiner*—Chris Schwartz
*Attorney, Agent, or Firm*—Harness, Dickey & Pierce

[57] ABSTRACT

An improved device for isolating a vehicle frame from an axle assembly is provided. This device is characterized such that deflection caused by road shock is severely limited when the vehicle is in a loaded condition and substantially higher when the vehicle is in an unloaded condition. The device comprises an elastomer shear spring; a circular outer ring surrounding the shear spring and mounted to the axle assembly; and an inner plunger having a top surface to which a load is applied and a lower portion comprising an elastomer compression spring.

6 Claims, 3 Drawing Sheets

SUSPENSION ISOLATING DEVICE

BACKGROUND OF THE INVENTION

This invention relates to a device for isolating a vehicle frame from an axle assembly adaptable for use on heavy duty vehicles. More particularly, the invention is directed to an isolating device characterized such that frame deflection is severely limited when the vehicle is in a loaded condition and substantially higher when the vehicle is in an unloaded condition.

While the invention is particularly directed to the art of vehicle suspension systems, and thus will be described with specific reference thereto, it will be appreciated that the invention may have utility in other fields and applications.

Isolating devices are used in heavy vehicle suspension systems to absorb road shock. Known means used to performed this function are hydraulic shock absorbers, rubber springs, metal springs and air bags. As but one example, FIG. 5 illustrates a typical truck front suspension axle assembly incorporating metal springs.

Unlike more traditional springs, air bags respond to loads with decreasing deflection as a load is increased, providing better ride characteristics for vehicle passengers and cargo when empty or heavily laden. An example of an air bag is the MARSH MELLOW® manufactured by Firestone Industrial Products Company. Air bags are manufactured by using rubber cylinders with plies of rubber reinforced with steel wire. They are torus-shaped and are used to absorb shock in the range up to 30,000 lbs. However, these products are expensive to manufacture and cannot be adjusted to provide different responses for different vehicles and loading conditions.

The subject invention contemplates a new and improved suspension isolation device that eliminates the foregoing problems and others by, among other things, reducing production costs; providing for a wide variety of responses to variable loading conditions; and offering improved ride characteristics under such conditions.

SUMMARY OF THE INVENTION

An improved device for isolating a vehicle frame from an axle assembly is provided. This device is characterized such that deflection caused by road shock is severely limited when the vehicle is in a loaded condition and substantially higher when the vehicle is in an unloaded condition. The device comprises an elastomer shear spring; a circular outer ring surrounding the shear spring and mounted to the axle assembly; and an inner plunger having a top surface to which a load is applied and a lower portion comprising an elastomer compression spring.

In one aspect of the invention, the spring rate of the isolation device is soft in empty or lightly loaded condition and hard in the heavily loaded condition.

In another aspect of the invention, the device can be tuned to produce ideal riding conditions during both light conditions and heavily loaded conditions.

An advantage of the device is that it is less expensive to manufacture than competing devices, while providing improved isolation benefits.

Another advantage of the device is that it can be made lighter than competitive devices.

Another advantage of the device is that it can be tuned to provide different responses for different vehicles and loading conditions.

Another advantage of the device is that it is tuned by varying the height of the compression section of the center plunger.

Another advantage of the device is that it provides improved ride characteristics for a vehicle that is empty or lightly loaded.

Another advantage of the device is that it can be adjusted to provide different ride characteristics while the vehicle is in operation.

Further scope of the applicability of the present invention will become apparent from the detailed description provided below. It should be understood, however, that the detailed description and specific examples, while illustrating preferred embodiments of the invention, are given by way of illustration only, since various changes and modifications within the spirit and scope of the invention will be apparent to those skilled in the art.

DESCRIPTION OF THE DRAWINGS

The present invention exists in the construction, arrangement and combination of various parts of the device, whereby the objects contemplated are attained as hereinafter more fully set forth, specifically pointed out in the claims, and illustrated in the accompanying drawing in which:

FIG. 5 is a perspective view of a typical truck suspension system on a front axle.

DETAILED DESCRIPTION OF THE PREFERRED EMBODIMENTS

Figure 1:
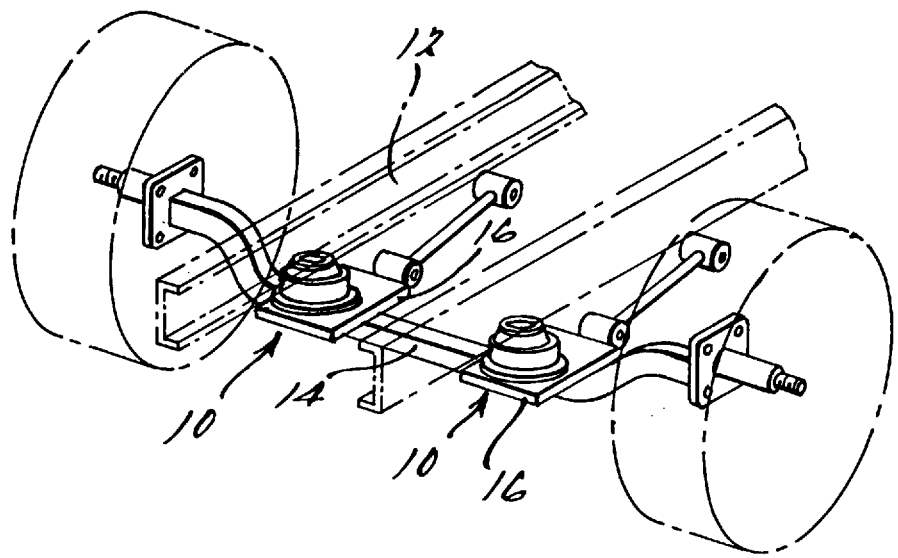
FIG. 1 is a perspective view of selected portions of a vehicle frame, suspension and axle system having disposed therein an isolation device according to the present invention.

Referring now to the drawings, which are for purposes of illustrating the preferred embodiments of the invention only and not for purposes of limiting the same, FIG. 1 provides a view of the overall preferred embodiment of an axle isolation device installed in a vehicle. While it is appreciated that vehicle types may vary, resulting in variations of the suspension system and of the points of attachment of the isolation device 10, as exemplary shown here, the axle isolation device 10 generally is used in conjunction with a vehicle frame 12 and an axle 14.

Figure 2:
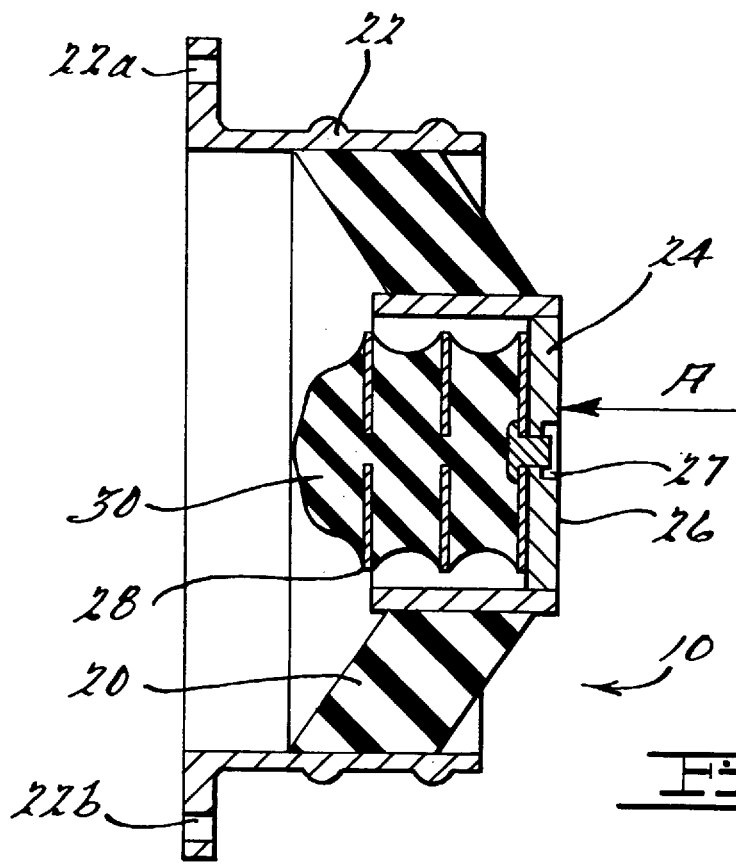
FIG. 2 is a cross-sectional view of the isolation device of FIG. 1 in an unloaded position.
Figure 2:
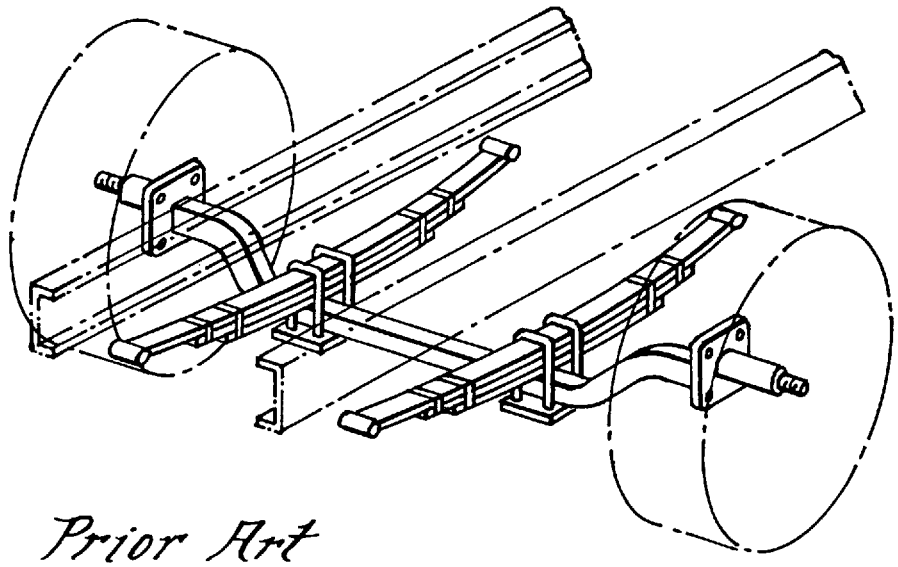
Figure 3:
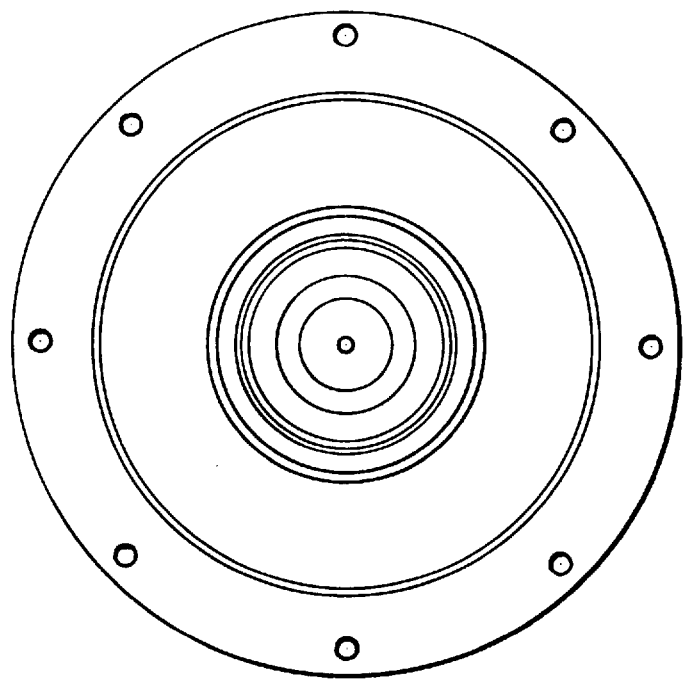
FIG. 3 is a bottom plan view of the isolation device of FIGS. 1 and 2.

Referring now more particularly to FIGS. 1, 2 and 3, the isolation device 10 comprises an elastomer shear spring 20, a circular outer ring 22 and an inner plunger 24. The inner plunger 24 comprises a top surface portion 26 that receives a load A, top pin socket 27 and a lower portion 28 comprising an elastomer compression spring 30. The axle isolation device 10 is mounted on a support plate 16 mounted on the vehicle axle 14. A load bearing pin (not shown) is received within top pin socket 27 adjacent the top surface portion 26 of inner plunger 24. The isolation device 10 is secured to support plate 16 by any conventional means. Preferably, bolts or screws are inserted through apertures 22a and 22b and secured to the support plate 16.

The shear spring 20 deflects when opposing loads are applied to inner plunger 24 through top pin socket 27. When the vehicle is empty or lightly loaded, shear spring 20 deflects in shear, providing vibration isolation and a comfortable ride. As the load is increased, the lower portion 28 of isolation device 10 is engaged and the spring rate becomes higher. When the vehicle is heavily loaded, the opposing forces are much higher and the shear spring deflects to a point where the lower portion 28 of inner plunger 24 contacts the top surface of support plate 16. The lower portion 28 of isolation device 10 is tapered so that the engagement of this section is not obvious to the vehicle's driver as it comes into play.

As load A is increased, the compression spring 30 is deflected to a greater extent. However because, the compression spring 30 is an elastomeric spring, it deflects less under compression than it would if it were under shear, like shear spring 20 so the compression spring 30 supports higher loads more effectively.

As the lower portion 28 of inner plunger 24 is brought into contact with the top surface of support plate 16, the spring rate of the axle isolation device 10 changes from a highly deflected shear spring into a compression spring to support the heavier load. The spring rates of the two elastomer segments, i.e., the compression spring 30 and shear spring 20, are added together to produce a response curve that is ideal for the vehicle.

Figure 4:
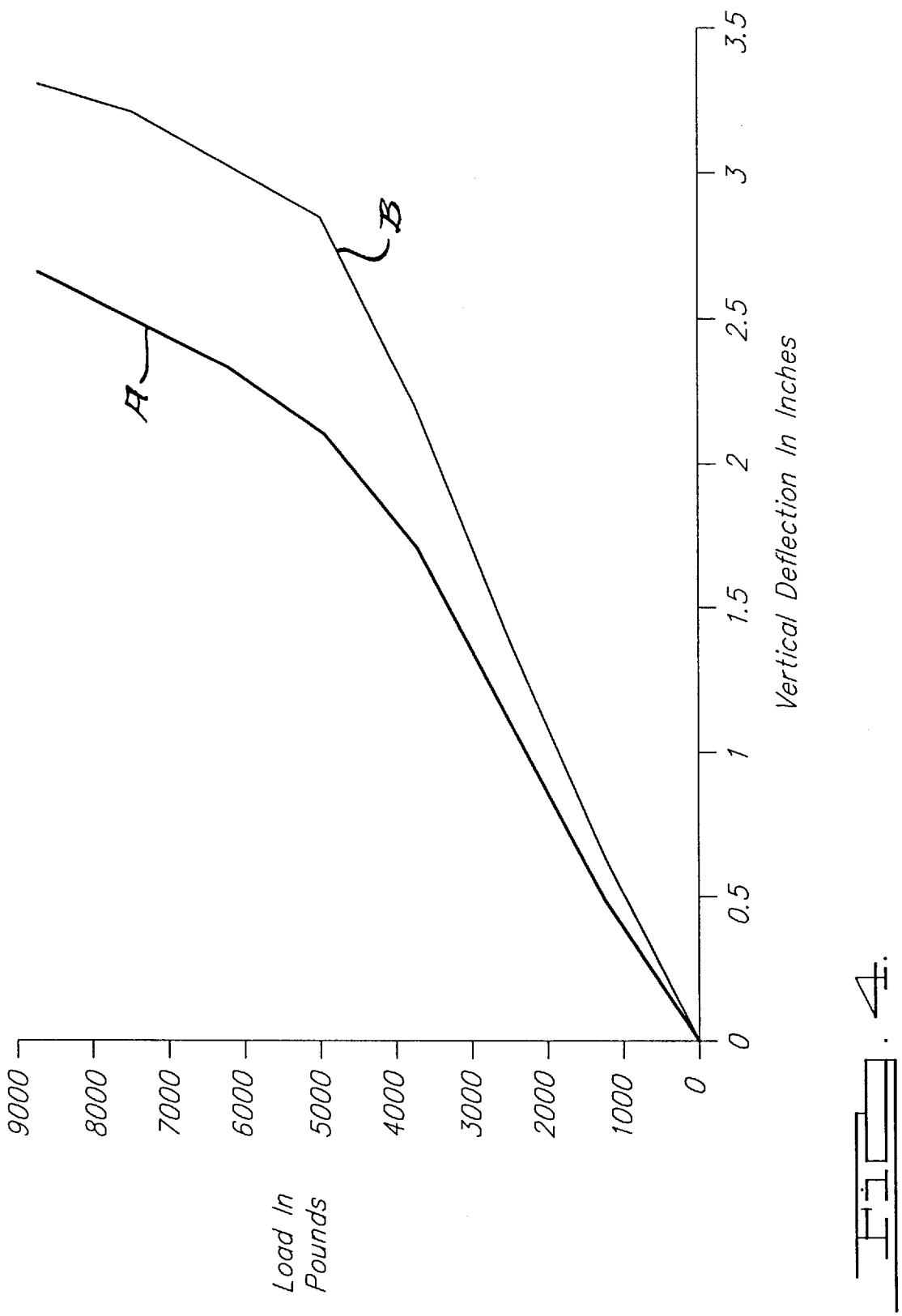
FIG. 4 shows static load-deflection curves relating to the subject invention.

FIG. 4 illustrates a static load-deflection curve A showing vertical deflection of the axle isolation device 10 as a function of load A. This curve can be tuned, or the spring rate of isolation device 10 modified, by varying the height of the compression spring 30 in the axle isolation device 10. For example, by moving the lower portion 28 of isolation device 10 downward toward the top surface of support plate 16, the top of curve A will shift away from the vertical axis and toward curve B. The isolation device 10 can be tuned to produce ideal riding conditions during running conditions and heavily loaded conditions. Of course, other parameters can be changed to vary responses as well, such as the type of elastomer, durometer and the number of plates in the compression spring 30. In addition, the shapes and configurations of the springs 20 and 30 could be varied to adjust the performance thereof, as those skilled in the art will appreciate. Further, shims could be placed below the spring 30 or a servomechanism and/or screw arrangement could be added to the device—to adjust the position of the spring 30 relative to the spring 20—to vary the response characteristics of the device.

In general, the axle isolation device 10 can be used in any application where steel springs, rubber compression springs, Clevite HYDRABLOC® or air bags are used. The axle isolation device 10 may be made of a compact design, allowing the device to be used where air bags are impractical, such as on the front axle of large trucks. The axle isolation device 10 may also be used to replace steel springs or other types of suspension means, such as the one shown in FIG. 5.

Unlike air bags and other devices using tire technology, the axle isolation device 10 is manufactured from molded rubber and containment materials, such as steel, aluminum and thermoplastic molded products which cost less. In this regard, while a variety of suitable materials may be used, the shear spring is preferably formed of natural rubber; the compression spring is preferably formed of natural rubber; the outer ring is preferably formed of steel or a polymer material; and the top surface portion is preferably formed of aluminum.

The above description merely provides a disclosure of particular embodiments of the invention and is not intended for the purposes of limiting the same thereto. As such, the invention is not limited to only the described embodiments. Rather, it is recognized that one skilled in the art could conceive alternative embodiments that follow within the scope of the invention.

Having thus described the invention, it is claimed:

1. A device for isolating a vehicle frame from an axle assembly, the device comprising:

an outer ring adapted to be mounted to the axle assembly, the outer ring having a central bore defining a first axis;

an elastomer shear spring disposed within the central bore of the outer ring, the elastomer shear spring having a central aperture defining a second axis; and an elastomer compression spring positioned within the central aperture of the elastomer shear spring, said elastomer compression spring having a top surface to which a load is applied and a lower part adapted to contact said axle assembly after a predetermined deflection of said elastomer shear spring.

2. The device as set forth in claim 1 wherein said first and second axes are parallel.

3. The device as set forth in claim 1 wherein said first and second axes are coincident.

4. An isolation spring having a static load-deflection curve, said isolation spring comprising:

an outer ring having a central bore defining a first axis;

an elastomer shear spring disposed within the central bore of the outer ring, the elastomer shear spring having a central aperture defining a second axis and a first load-deflection curve; and an elastomer compression spring positioned within the central aperture of the elastomer shear spring having a second load-deflection curve, said static load deflection curve having a first portion defined by said first load-deflection curve and a second portion defined by a combination of said first and second load-deflection curves.

5. The device as set forth in claim 4 wherein said first and second axes are parallel.

6. The device as set forth in claim 4 wherein said first and second axes are coincident.

* * * * *